US012608421B2

(12) United States Patent
Becker et al.

(10) Patent No.: US 12,608,421 B2
(45) Date of Patent: Apr. 21, 2026

(54) SYSTEM AND METHOD FOR LARGE ASSET DEPLOYMENT FOR EXTENDED REALITY DEVICES

(71) Applicant: DISNEY ENTERPRISES, INC., Burbank, CA (US)

(72) Inventors: Michael Becker, Paulsbo, WA (US); Nicholas Maggio, Pittsford, NY (US); Mark R. Mine, Santa Clarita, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 198 days.

(21) Appl. No.: 18/367,565

(22) Filed: Sep. 13, 2023

(65) Prior Publication Data

US 2025/0086228 A1     Mar. 13, 2025

(51) Int. Cl.
G06F 16/74      (2019.01)
G06T 19/00      (2011.01)
H04N 21/854     (2011.01)

(52) U.S. Cl.
CPC .......... G06F 16/743 (2019.01); G06T 19/006 (2013.01); H04N 21/854 (2013.01)

(58) Field of Classification Search
CPC ...... G06F 16/743; G06F 3/011; G06T 19/006; H04N 21/854
See application file for complete search history.

(56) References Cited

U.S. PATENT DOCUMENTS

| | | | |
|---|---|---|---|
| 10,133,567 B1 | 11/2018 | Cumming | |
| 10,586,395 B2 | 3/2020 | Mullins et al. | |
| 11,100,724 B2 | 8/2021 | Brimhall et al. | |
| 2007/0239788 A1 | 10/2007 | Cunningham et al. | |
| 2010/0156913 A1 | 6/2010 | Ortega et al. | |
| 2012/0249544 A1 | 10/2012 | Maciocci et al. | |
| 2013/0293468 A1 | 11/2013 | Perez et al. | |
| 2017/0242575 A1 | 8/2017 | Mathur et al. | |
| 2018/0173323 A1 | 6/2018 | Harvey et al. | |
| 2018/0352048 A1* | 12/2018 | Demsey .............. G06F 16/9574 | |
| 2021/0056762 A1 | 2/2021 | Robbe et al. | |
| 2022/0068029 A1* | 3/2022 | Lane ..................... G06F 3/0482 | |
| 2023/0215075 A1* | 7/2023 | Peri ....................... H04L 67/141 | |
| | | | 345/633 |

(Continued)

OTHER PUBLICATIONS

Alshahrani et al., "Efficient Multi-Player Computation Offloading for VR Edge-Cloud Computing Systems", Appl. Sci. 2020, 10, 5515; doi:10.3390/10165515, 19 pages.

(Continued)

*Primary Examiner* — Cao H Nguyen
(74) *Attorney, Agent, or Firm* — Dorsey & Whitney LLP

(57)     ABSTRACT

A method includes connecting, using an application executing at an extended reality (XR) device, to a file system of rich media assets, where the file system is hosted at a server in communication with the XR device. The method further includes browsing, via the application at the XR device, the file system of rich media assets to select a rich media asset of the rich media assets and responsive to selection of the rich media asset, loading the rich media asset form the server to a memory of the XR device. The method further includes rendering, at a runtime of the application, content from the rich media asset, where the rendering allows the content to be viewed using the XR device.

19 Claims, 3 Drawing Sheets

(56) References Cited

U.S. PATENT DOCUMENTS

| | | | |
|---|---|---|---|
| 2024/0061545 A1* | 2/2024 | Gu ........................... | G06F 3/016 |
| 2025/0067986 A1* | 2/2025 | Marconcini ........ | G02B 27/0101 |

OTHER PUBLICATIONS

Kurt et al., "ARgent: A Web Based Augmented Reality Framework for Dynamic Content Generation", European Journal of Science and Technology Special Issue, pp. 244-257, Aug. 2020.

Shea et al., "Towards Fully Offloaded Cloud-based AR: Design, Implementation and Experience", MMSys'17, Jun. 20-23, 2017, Taipei, Taiwan, pp. 321-330.

Tsujimoto et al., "Server-Based Mixed-Reality System for Multiple Devices to Visualize a Large Architectural Model and Simulations", ANNSIM '22, Jul. 18-20, 2022, San Diego, CA, USA; Â@2022 Society for Modeling & Simulation International (SCS).

Verbelen et al., "Leveraging the Cloudlet for Immersive Collaborative Applications", IEEE Pervasive Computing 12(4):30-38, Oct. 2013, 7 pages.

* cited by examiner

300

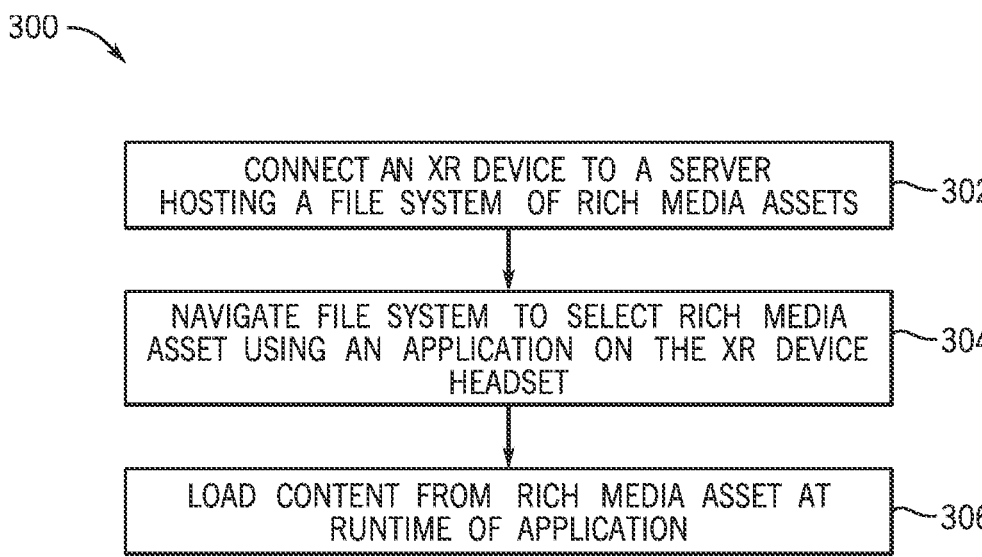

| | |
|---|---|
| CONNECT AN XR DEVICE TO A SERVER HOSTING A FILE SYSTEM OF RICH MEDIA ASSETS | 302 |
| NAVIGATE FILE SYSTEM TO SELECT RICH MEDIA ASSET USING AN APPLICATION ON THE XR DEVICE HEADSET | 304 |
| LOAD CONTENT FROM RICH MEDIA ASSET AT RUNTIME OF APPLICATION | 306 |

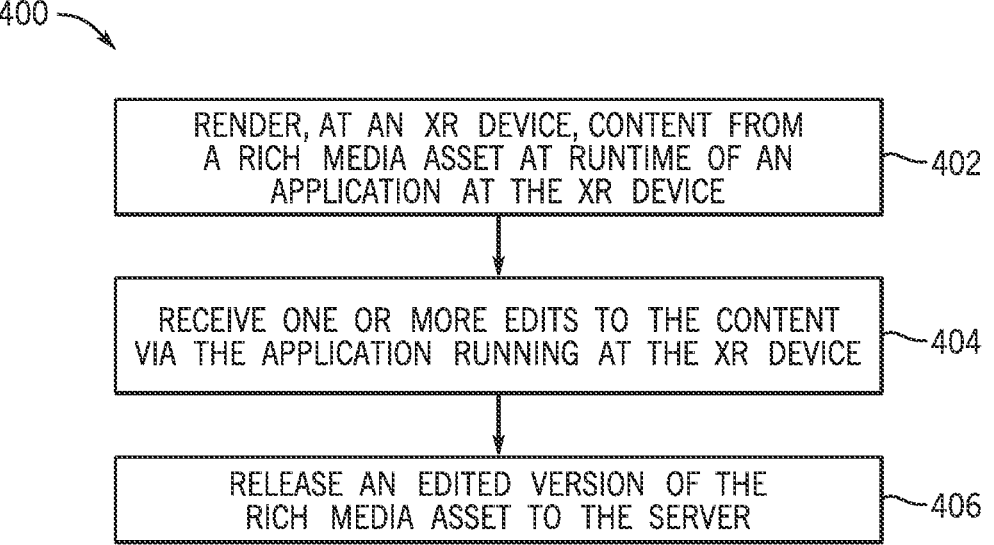

| | |
|---|---|
| RENDER, AT AN XR DEVICE, CONTENT FROM A RICH MEDIA ASSET AT RUNTIME OF AN APPLICATION AT THE XR DEVICE | 402 |
| RECEIVE ONE OR MORE EDITS TO THE CONTENT VIA THE APPLICATION RUNNING AT THE XR DEVICE | 404 |
| RELEASE AN EDITED VERSION OF THE RICH MEDIA ASSET TO THE SERVER | 406 |

FIG. 5

SYSTEM AND METHOD FOR LARGE ASSET DEPLOYMENT FOR EXTENDED REALITY DEVICES

FIELD

The present application relates to systems and methods of deploying digital assets to Extended Reality devices ("XR devices"), such as Augmented Reality and Virtual Reality headsets ("AR/VR headsets").

BACKGROUND

New motion picture formats, such as the ScreenX® format, may use multiple screens to display content. Editing films presented in such formats using conventional editing techniques may be difficult or may require viewing the film in a theater equipped to display films using such formats during the editing process, which can slow down the post-production editing process. Often editing of films for presentation in such formats may be facilitated by using AR/VR headsets to view the content. However, loading films to AR/VR headsets can be a confusing and cumbersome process and can require a wired connection to a computer storing the films to be edited. Further, once the films are loaded to the AR/VR headset, current methods often use remote rendering to render the film for viewing at the AR/VR headset. Such remote rendering may cause buffering and delays in viewing of content.

BRIEF SUMMARY

An example method disclosed herein includes connecting, using an application executing at an extended reality (XR) device, to a file system of rich media assets, where the file system is hosted at a server in communication with the XR device. The method further includes browsing, via the application at the XR device, the file system of rich media assets to select a rich media asset of the rich media assets and responsive to selection of the rich media asset, loading the rich media asset form the server to a memory of the XR device. The method further includes rendering, at a runtime of the application, content from the rich media asset, where the rendering allows the content to be viewed using the XR device.

In some examples, the content rendered from the rich media asset is a motion picture.

In some examples, rendering the content form the rich media asset comprises utilizing one or more processors of the XR device to render the content.

In some examples, the server is in communication with the XR device via a shared private network.

In some examples, loading the rich media asset from the server includes temporarily downloading the rich media asset to the memory of the XR device.

In some examples, the method further includes receiving one or more edits to the rich media asset via the application at the XR device, where the one or more edits are incorporated into the rich media asset to create an edited version of the rich media asset. The method may further include storing the edited version of the rich media asset at the memory of the XR device and releasing the edited version of the rich media asset to the server.

In some examples, the method further includes releasing the edited version of the rich media asset to the server and removing the edited version of the rich media asset from the memory of the XR device.

In some examples, the edited version of the rich media asset is released to the server responsive to an end of a lifecycle of the application at the XR device.

An example extended reality (XR) device disclosed herein includes a user interface, one or more processors, and memory encoding instructions which, when executed by the one or more processors to connect to a file system of rich media assets, where the file system of rich media assets is hosted at a server in communication with the XR device. The instructions further cause the one or more processors to receive a selection of a rich media asset of the rich media assets via a user input to the user interface of the XR device, responsive to the selection of the rich media asset, load the rich media asset to the memory of the XR device and render, at the XR device, content from the rich media asset, where the rendering allows the content to be viewed using the user interface of the XR device.

In some examples, the rich media asset is a motion picture.

In some examples, the one or more processors are configured to render the media from the rich media asset at the XR device using a rendering engine at the XR device.

In some examples, the one or more processors are further configured to load the rich media asset from the server by temporarily downloading the rich media asset to the memory of the XR device.

In some examples, the one or more processors are further configured to receive, via the user interface, one or more edits to the rich media asset, incorporate the one or more edits to create an edited version of the rich media asset, and store the edited version of the rich media asset at the memory of the XR device.

In some examples, the one or more processors are configured to load the rich media asset from the server by temporarily downloading the rich media asset to the memory of the XR device, where the one or more processors are further configured to release the edited version of the rich media asset to the server by removing the edited version of the rich media asset from the memory of the XR device.

Example one or more non-transitory computer readable media disclosed herein are encoded with instructions which, when executed by one or more processors of an extended reality (XR) device, cause the XR device to connect, using a wireless protocol, to a server storing a plurality of rich media assets in a file system, download, using the wireless protocol, a rich media asset of the plurality of rich media assets, where the rich media asset is selected from the file system by a user of the XR device via an application executing at the XR device, and render, at a runtime of the application, content of the rich media asset, where the rendering allows the media to be viewed using the XR device.

In some examples, the rich media asset is a motion picture.

In some examples, rendering, at the runtime of the application, the content from the rich media asset comprises utilizing a rendering engine executing on the one or more processors of the XR device.

In some examples, the wireless protocol comprises a shared and secured Wi-Fi network.

In some examples, downloading the rich media asset comprises downloading the rich media asset to a temporary storage location of the XR device.

In some examples, the instructions further cause the XR device to receive one or more edits to the rich media asset via the application at the XR device, where the one or more edits are incorporated into the rich media asset to create an edited version of the rich media asset and store the rich media asset at a temporary storage location of the XR device.

In some examples, the instructions further cause the XR device to release the edited version of the rich media asset of the server and remove the edited version of the rich media asset from the temporary storage location.

BRIEF DESCRIPTION OF THE DRAWINGS

FIG. 4 is a flow chart illustrating a process for loading rich media assets from a server to an AR/VR headset using the systems described herein.

FIG. 5 is a flow chart illustrating a process for rendering and editing rich media assets and an AR/VR headset using the systems described herein.

DETAILED DESCRIPTION

Figures 1, 2:
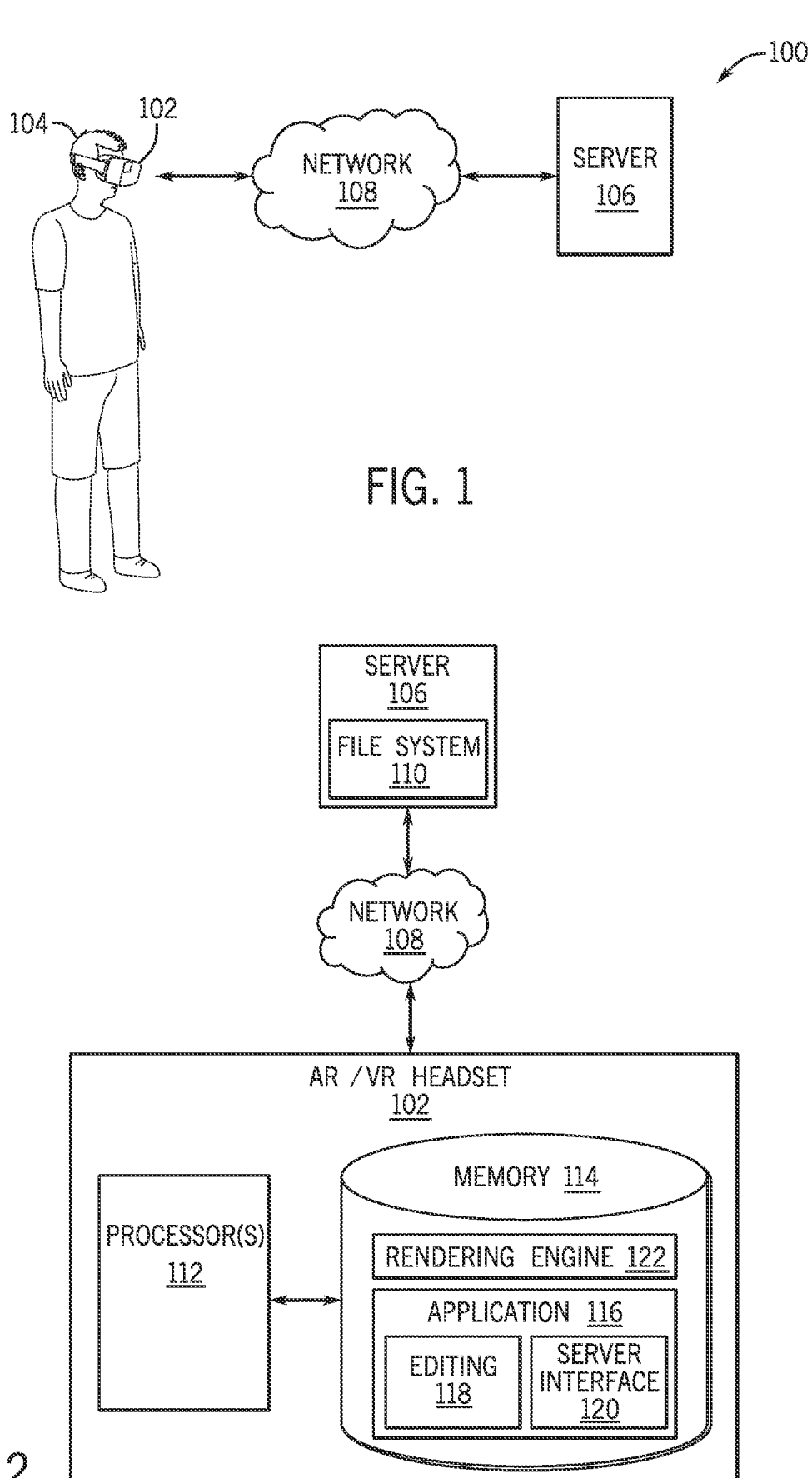
FIG. 1 illustrates an example environment for large asset deployment for AR/VR headsets.
FIG. 2 illustrates an example AR/VR headset in communication with a server implementing large asset deployment to the AR/VR headset.

Systems and methods described herein provide for streamlined deployment of large media assets to wearable or other interactive displays, including XR devices such as AR/VR headsets, heads up displays, smart glasses, holographic displays, and handheld devices (e.g., smart phones). For example, large media assets may include content (e.g., media) to be viewed using an AR/VR headset, such as motion pictures in ScreenX® or other immersive formats. Such formats may display content on multiple projection surfaces (e.g., on three walls of a theater), on specialized projection surfaces (e.g., oversized screens, screens with specialized aspect ratios, and the like), or using other methods. For example, immersive motion picture formats may be displayed in specialized theaters, such that the editing and other post-production operations may require viewing in such a specialized theater or use of another method allowing for viewing of all content. AR/VR headsets may generally be used as an alternative to viewing in a specialized theater. AR/VR headsets and other XR devices may be used to view and edit motion pictures, such as movies, television shows, video games, animations, and similar types of works. AR/VR headsets and other XR devices may similarly be used to view and edit or create other types of content contained in large media assets, such as interactive video games, immersive experiences, and other extended reality experiences.

Current solutions for viewing content using XR devices are technically complex. For example, to view motion pictures using AR/VR headsets, media assets containing content, such as large media assets and/or rich media assets, may generally be transferred to AR/VR headsets using hard wired connections with a server hosting the media assets. Such hardwired connections may generally be utilized to improve security of media assets (e.g., to prevent unauthorized access to un-released motion pictures). For example, media assets may be transferred to an AR/VR headset by sideloading a media asset to the headset using a hardwired connection to the server. For example, sideloading may involve copying or transferring media assets directly from a storage location (e.g., a server) to the AR/VR headset using a wired connection. Generally, sideloading may result in a media asset being stored at the AR/VR headset such that the media asset is able to be transferred or copied to other devices. Such sideloading is often a cumbersome and technical process, which may be difficult for non-technical personnel participating in the editing process. Further, sideloading rich media assets to an AR/VR headset requires utilizing storage space on the AR/VR headset, such that multiple rich media assets often cannot be stored on the AR/VR headset due to limited storage space. Further, the sideloading process must be frequently repeated when viewing new content and/or editing new media assets.

Current solutions may further utilize remote rendering of content from media assets loaded to an AR/VR headset. For example, content may be rendered from media assets using remote compute resources in communication with the AR/VR headset. Such remote rendering and streaming introduces latency into the rendering process, which may cause buffering delays and other difficulties viewing the content.

Systems and methods described herein simplify the process of distributing and loading media assets to XR devices, such as AR/VR headsets by utilizing an application executing at an XR device to dynamically load rich media assets to the XR device. For example, instead of utilizing a hardwired connection to a server, a user may launch an application at an AR/VR headset and navigate through files on the server to locate a media asset, such as a rich media asset. In some examples, the user may access the server only when the server and AR/VR headset are on the same network (e.g., a same wireless network) or are otherwise securely connected, helping to prevent unauthorized access to the rich media asset. The rich media asset may be rendered for viewing using compute resources at the AR/VR headset (e.g., using a rendering engine or the like), removing latency and buffering delays from the viewing process.

As used herein, a media asset may be a file storing any type of media content, such as video, audio, and the like. A rich media asset may be a particular type of media asset. For example, a rich media asset may be a file storing media with features such as audio, video, and/or interactive elements. As used herein, a large media asset may be a media asset using a larger than typical amount of storage space, such as a media asset utilizing many gigabytes of data. In various examples, a rich media asset may be a large media asset.

During runtime of the application, a user may be able to provide comments, changes or edits (e.g., annotations, destructive edits, and the like) to the content as metadata or other data stored by the media asset. An edited version of the media asset may be released to the server when the application is closed, removing the additional step of offloading media assets while freeing up storage space on the AR/VR headset. Release of the media asset at termination of the application further preserves security of the content of the media assets, as the media assets and associated content do not persist at the AR/VR headset after viewing and/or editing via the application. Accordingly, the methods and systems described herein streamline and simplify the process of editing media assets, such as motion pictures configured for display using immersive formats.

Turning now to the drawings, FIG. 1 illustrates an example environment 100 for large media asset deployment for AR/VR headsets. Though FIG. 1 is shown including an AR/VR headset, it is understood that the systems and methods described herein may similarly be used with respect to other types of XR devices. An AR/VR headset 102 worn by a user 104 may communicate with a server 106 via a network 108. For example, the server 106 may store media assets (e.g., large media assets and/or rich media assets)

which may be deployed to the AR/VR headset 102 via the network 108. The user 104 may utilize an application executing at the AR/VR headset 102 to browse media assets stored at the server 106. Once loaded to the AR/VR headset 102, the content of the media asset may be rendered at the AR/VR headset 102 and the user 104 may provide edits to the content through the application. At the conclusion of the lifecycle of the application (e.g., when the application is closed or otherwise terminated by the user 104 after a session of use), the media asset including any accompanying edits to the content may be released back to the server 106.

Generally, the user 104 may access the server 106 and media assets stored on the server 106 using the AR/VR headset 102 and without use of other computing devices. For example, the user may connect to and navigate through files on the server 106 while wearing the AR/VR headset 102 and may use gestures, voice commands, or other methods of interacting the AR/VR headset 102 to perform such navigation. Content (e.g., media) from media assets is rendered and viewed at the AR/VR headset 102 such that the content of the media asset appears to the user 104 to be displayed in a similar manner to an immersive format of the content. For example, where the content is formatted to be presented using multiple projection surfaces, the content of the rich media asset may be rendered at the AR/VR headset 102 such that the content appears, to the user 104, to be presented on multiple projection surfaces. Similarly, the user 104 may provide edits to the media assets using gestures, voice commands, or other conventional methods of interacting with the AR/VR headset 102.

After content of a rich media asset is viewed and/or a media asset is edited at the AR/VR headset 102, the AR/VR headset 102 may automatically release the media asset (or an edited version of the media asset) back to the server 106 via the network without further action by the user 104. For example, the AR/VR headset 102 may utilize garbage collection features of a rendering engine on the AR/VR headset 102 to remove the rich media asset from the AR/VR headset 102 at the end of the lifecycle of the application used to view and/or edit the media asset. That is, when the user 104 exits the application, the media asset may be removed from any storage of the AR/VR headset 102 (i.e., deleted from cache or other storage locations). Accordingly, the user 104 may be prevented from downloading or otherwise obtaining a copy of the content of the media asset through the AR/VR headset 102, providing improved security for rich media assets and helping to protect against unauthorized release or leaks of early versions of motion pictures or other high value rich media assets.

Though the environment 100 is shown including on AR/VR headset 102 connected by a network 108 to one server 106, additional and/or different components may be included in the environment 100 in various examples. For example, multiple AR/VR headsets, XR devices, and/or other computing devices may connect to the network 108 and have access to the server 106. In some examples, other computing devices may access the server 106 using an alternate network or type of network connection. Similarly, the AR/VR headset 102 may connect to multiple servers in addition to the server 106.

FIG. 2 illustrates a schematic diagram of the AR/VR headset 102 in communication with the server 106 via the network 108. Though the schematic diagram is show as an AR/VR headset 102, other XR devices may include the same or similar components. As shown, the AR/VR headset 102 may include memory 114 and one or more processors 112. The memory 114 may generally include instructions for an application 116 which may be utilized to view content from media assets, edit the media assets, and communicate with the server 106. The memory 114 may further include a rendering engine 122, which may communicate with the application 116 to render content from media assets at the AR/VR headset 102. The server 106 may generally host a file system 110, which may include media assets including rich media assets or other large media assets.

In various examples, the server 106 may be implemented by one or more computing devices or combinations of computing resources. For example, the server 106 may generally be implemented by computing resources including hardware for memory and one or more processors. For example, the server 106 may utilize or include one or more processors, such as a CPU, GPU, and/or programmable or configurable logic. In some embodiments, various components of the server 106 may be distributed across various computing resources, such that the components of the server 106 communicate with one another through the network 108 or using other communications protocols. Memory or storage of the server 106 may similarly be distributed across various physical computing devices.

The server 106 may generally host a file system 110 including media assets, which may be large media assets and/or rich media assets. The media assets may be loaded from the file system 110 to the AR/VR headset 102 using processes described herein. For example, rich media assets stored in the file system 110 may be located at a storage of the server 106. Rich media assets may include, for example, motion pictures, immersive games, and the like. In some examples, all rich media assets stored in the file system 110 may be accessible by the AR/VR headset 102 by virtue of the connection between the AR/VR headset 102 and the server 106 via the network 108. In some examples, some rich media assets, folders of rich media assets, and/or other sub-portions of the file system 110 may be further protected and may require additional authentication (e.g., specialized user credentials, preauthorization of the AR/VR headset 102, and the like) to access the rich media assets located in the relevant sub-portions of the file system 110, providing additional security for high priority media assets.

The AR/VR headset 102 may generally be utilized by the user 104 to view content rendered from media assets and/or edit media assets associated with viewed content, including rich media assets such as motion pictures. In other examples, the AR/VR headset 102 may present other content rendered from media assets, such as a video game or other type of augmented or virtual reality experience. The AR/VR headset 102 may generally be a head-mounted system, such as a visor, glasses, goggles, or the like. The AR/VR headset 102 may include a display, such as an optical display and/or a video display, such as an OLED or LED display. In some examples, the optical display and/or the video display may be see-through, such that the displayed content supplements the user's real world environment with overlaid digital objects. In various examples, the AR/VR headset 102 may include user interface components configured to recognize user gestures, voice commands, input from particular controllers, and the like for the user to interact with the AR/VR headset 102.

The AR/VR headset 102 may generally include at least a processor 112 and a storage or memory component 114. The memory 114 may be utilized to store media assets obtained from the server 106 during the lifecycle of the application 116. That is, the media assets may be downloaded to the memory 114 to be viewed using the application 116. However, when the application 116 is terminated, the media assets are removed from the memory 114 (e.g., by being released back to the server 106). Generally, the memory 114 may store (e.g., be encoded with) executable instructions, such as instructions for the application 116 and the rendering engine 122. User settings, credentials, additional applications, and/or other data may also be stored at memory 114. The processor 112 of the AR/VR headset 102 may generally execute instructions stored at the memory 114 of the AR/VR headset 102.

The processor 112 may further be utilized to render content from media assets and to perform other functions. For example, the processor 112 may execute instructions implementing the rendering engine 122 at the AR/VR headset 102 to render content from media assets at the AR/VR headset 102. In various examples, the application 116 may be integrated with the rendering engine 122 such that the application 116 and the rendering engine 122 may share data to effectuate viewing of content of media assets and/or editing of media assets at the AR/VR headset 102. The rendering engine 122 may, in some examples, be implemented by a conventional rendering or gaming engine, such as the UNITY engine, UNREAL engine, or similar. The rendering engine 122 may generally render content from the downloaded media assets for viewing at the AR/VR headset 102. In some examples, the rendering engine 122 may further be utilized to integrate editing features of the application 116 into the interface for viewing the content of the media assets. For example, the rendering engine 122 may provide a spatial interface for presentation of editing features, a timeline to allow syncing of edits to particular portions of content, and the like.

The application 116 may include functionality for editing 118 and a server interface 120. Generally, when executed by the processor 112, instructions for the server interface 120 may connect with and/or interact with the server 106 to allow the AR/VR headset 102 to, in various examples, connect with the server 106 upon initiation of the application 116, browse available files on the file system 110, release media assets back to the server 106, and the like. In various examples, the server interface 120 may communicate with the rendering engine 122 to facilitate rendering, viewing, and/or editing of content from media assets obtained from the server 106. For example, the server interface 120 may make API calls to the rendering engine 122 to render content obtained from the server 106. The server interface 120 may similarly communicate with the rendering engine 122 to release edited media assets back to the server 106 upon completion of the lifecycle of the application 116.

Functionality for editing 118 may, when executed by the processor 112, receive information from a user interface of the AR/VR headset 102 to effectuate edits to a media asset associated with content being viewed using the AR/VR headset 102. For example, a user (e.g., user 104) may utilize gestures, voice commands, controllers, or other interactions with the AR/VR headset 102 to provide suggested edits to and/or notes regarding the content, which may be provided as edits to the media asset. In various examples, such edits may include destructive edits (e.g., deleting portions of content from the media asset), annotations, adjustments to audio, and edits to other aspects of the content of the rich media asset. Editing 118 may further create a new or edited version of the media asset incorporating the edits and may communicate with the server interface 120 to release the edited version of the media asset back to the server 106 upon completion of the edits.

The network 108 may be implemented using one or more of various systems and protocols for communications between computing devices. In various embodiments, the network 108 or various portions of the network 108 may be implemented using the Internet, a local area network (LAN), a wide area network (WAN), and/or other networks. In addition to traditional data networking protocols, in some embodiments, data may be communicated according to protocols and/or standards including near field communication (NFC), Bluetooth, cellular connections, and the like.

In various examples, the network 108 may provide a secure connection between the AR/VR headset 102 and the server 106. For example, the AR/VR headset 102 may be able to connect to the server 106 when the network 108 is a shared private network and the AR/VR headset 102 and the server 106 are each connected to the network 108. Such connection may be through connecting to a network in the same physical location (e.g., a private Wi-Fi network), connecting to a shared network remotely using access credentials (e.g., a virtual private network), a direct connection between the AR/VR headset 102 and the server 106 (e.g., a BLUETOOTH connection), and the like.

Figure 3:
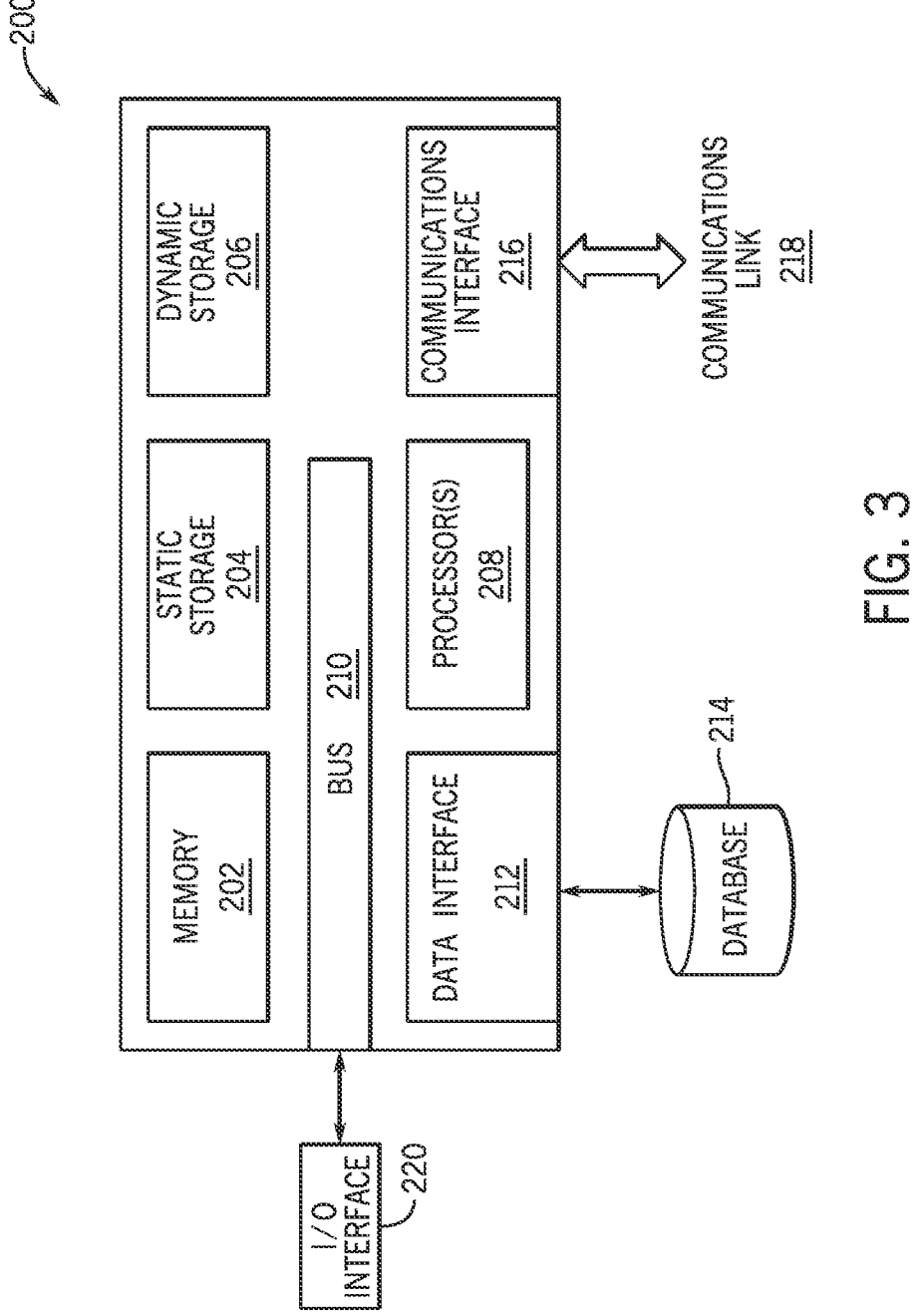
FIG. 3 is an example computing system used in various examples of the disclosure.

Turning to FIG. 3, an example computing system 200 may be used for implementing various embodiments in the examples described herein. For example, in various embodiments, components of the AR/VR headset 102 may be implemented by one or several computing systems 200. For example, the AR/VR headset 102 may include or be implemented by a computing system 200. Similarly, other XR devices may be implemented by one or several computing systems 200. In various examples, the server 106 may be implemented by one or more computing systems 200. This disclosure contemplates any suitable number of computing systems 200. For example, the computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 220 (e.g., keyboard, keypad, mouse, microphone). In particular embodiments, the computing system 200 may include one or more of any such components.

In particular embodiments, processor 208 includes hardware for executing instructions, such as those making up a computer program. For example, a processor 208 may execute instructions for various components of a ride concealment system. The processor 208 circuitry includes circuitry for performing various processing functions, such as executing specific software for performing specific calculations or tasks. In particular embodiments, I/O interface 220 includes hardware, software, or both, providing one or more interfaces for communication between computing system 200 and one or more I/O devices. Computing system 200 may include one or more of these I/O devices, where appropriate. One or more of these I/O devices may enable communication between a person and computing system 200.

In particular embodiments, the communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate accesses to memory 202 requested by processor 208. In particular embodiments, bus 210 includes hardware, software, or both coupling components of computing system 200 to each other.

According to particular embodiments, computing system 200 performs specific operations by processor 208 executing one or more sequences of one or more instructions contained in memory 202. In various examples, the processor 112 of FIG. 1 may be implemented by a processor 208 and the memory 114 of FIG. 1 may be implemented by a memory 202. For example, instructions for the application 116 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to, nonvolatile media and volatile media. Non-volatile media includes, for example, optical or magnetic disks, such as static storage 204 or dynamic storage 206. Volatile media includes dynamic memory, such as memory 202.

Computing system 200 may transmit and receive messages, data, and instructions, including program, e.g., application code, through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212. In various examples, a communications link 218 at the AR/VR headset 102 may communicate with the server 106, and/or computing components within the network 108.

FIG. 4 illustrates an example process 300 for loading rich media assets from a server to an AR/VR headset using the systems and methods described herein. Though FIG. 4 describes loading of rich media assets, other types of media assets may be loaded using the same or similar processes. Similarly, through FIG. 4 describes loading of media assets to an AR/VR headset 102, the same or similar processes may be utilized to load media assets to other types of XR devices. At block 302, the AR/VR headset 102 connects to the server 106 hosting a file system 110 of rich media assets. The AR/VR headset 102 may be automatically connected to the server 106 via a connection to the network 108. For example, the AR/VR headset 102 and the server 106 may each automatically connect to a shared wireless network (e.g., a private Wi-Fi network) and the AR/VR headset 102 may be automatically connected to the server 106 via the shared wireless network. The AR/VR headset 102 may, in some examples, connect to the server 106 using other wireless protocols, such as BLUETOOTH. The AR/VR headset 102 may connect to additional servers at block 302.

The AR/VR headset 102 may connect to the server 106 responsive to launching the application 116 at the AR/VR headset 102. For example, after the application 116 launches at the AR/VR headset 102, the application 116 may prompt the user to select a server 110 or other storage location of rich media assets which may be viewed using the application 116. In some examples, the AR/VR headset 102 may connect to the server 106 using access credentials, passwords, or using other tokens to increase security of the rich media assets at the server 106.

The AR/VR headset 102 (e.g., the user through the application 116 executing at the AR/VR headset) navigates the file system 110 to select a rich media asset at block 304. The AR/VR headset 102 may display all rich media assets available at the server 106 upon launching the application 116. Accordingly, the user may navigate through the file system 110 during the lifecycle of the application 116. In some examples, the server interface 120 may communicate with the server 106 to obtain a list of rich media assets within the file system 110 which may be opened and viewed using the application 116 and the rendering engine 122. The server interface 120 may communicate with the rendering engine 122 to display the list of available rich media assets within the file system 110 to the user and to receive input from the user selecting a particular rich media asset from within the file system 110.

In some examples, the AR/VR headset 102 may display all rich media assets at the file system 110 at block 304. In some examples, the AR/VR headset 102 may display only rich media assets that the AR/VR headset 102 has permission to view and edit. For example, some rich media assets may be visible only to certain users (e.g., those associated with a particular project) to provide additional security for the rich media assets. In some examples, the AR/VR headset 102 may be connected to multiple servers and may display the rich media assets at all connected servers at block 304.

A user of the AR/VR headset 102 may navigate through various folders of the file system 110 to locate rich media assets for downloading to the AR/VR headset 102. For example, the AR/VR headset 102 (e.g., using rendering engine 122) may receive input from the user 104 to select a rich media asset including content to view and/or edit at the AR/VR headset 102. In some examples, upon selecting a rich media asset, the user may be prompted for access credentials or other authentication before the rich media asset can be downloaded to the AR/VR headset 102. In various examples, any rich media assets loaded to the server 106 may be viewable by the user using the application 116. Any listings of such rich media assets may dynamically update as new assets are added to the server 106. For example, a user may refresh the application 116 to view a current listing of all rich media assets available at the server 106.

At block 306, the AR/VR headset 102 loads content from the rich media asset at runtime of the application 116. For example, the server interface 120 of the application 116 may communicate with the server 106 to download the selected rich media asset from the file system 110. In various examples, the download may cause the rich media asset to be stored at a temporary storage location of the AR/VR headset 102. The temporary storage location may be at the memory 114 or at another storage or memory location of the AR/VR headset 102.

In various examples, the temporary storage location may be accessible only by the application 116 and/or the rendering engine 122 during the runtime (e.g., lifecycle) of the application 116. Accordingly, the rich media asset may be removed (e.g., erased from the temporary storage location or otherwise removed by garbage collection operations) when the application 116 is terminated. Because the content of the rich media asset is available only for viewing and/or editing using the application 116, users are prevented from transferring rich media assets and/or content to other computing devices, offloading rich media assets and/or content, or otherwise distributing rich media assets and/or content based on the copy available on the AR/VR headset 102, generally improving security procedures for sensitive content, such as unreleased motion pictures. Further, removing rich media assets after runtime of the application frees up storage space on the AR/VR headset 102 without the user having to manually remove rich media assets from the AR/VR headset 102.

FIG. 5 illustrates an example process 400 for rendering and editing content of rich media assets at an XR device using the systems and methods described herein. In various examples, the process 400 may be performed after the process 300 described with respect to FIG. 4. At block 402, the XR device renders content (e.g., media) from a rich media asset at runtime of an application at the XR device. Runtime may generally be a period of time during which the application is being executed at the XR device. In various examples, content may be a motion picture, game, or other media type generated by rendering the rich media asset. Generally, the XR device renders the content using one or more processors at the XR device (e.g., processor 112 at the AR/VR headset 102). In some examples, the XR device may utilize additional processors to render the content. Rendering the content at the XR device reduces lag or other viewing issues which are generally associated with remote rendering and/or streaming of content and media. The XR device may render the content using a rendering engine at the XR device (e.g., rendering engine 122 and the AR/VR headset 102). For example, the application 116 may send a command (e.g., an API call) to the rendering engine 122, allowing the rendering engine 122 to access the rich media asset and to render the content from the rich media asset.

After rendering the content from the rich media asset, the content is generally presented to the user of the XR device through outputs of the XR device. For example, visual content may be rendered for viewing using an optical display, video display, or other display of the XR device. Audio content may be rendered using audio outputs (e.g., speakers) of the XR device. The display may display other elements and/or controls, such as playback controls (e.g., to pause, play, slowdown, or otherwise control playback of the media), volume controls, and the like. In various examples, the outputs of the XR device may further display user interface elements which may be utilized to provide edits to the rich media asset within the application executing at the XR device. For example, the display of the XR device may present selectable elements for providing annotations to the media, a timeline of the media, options for cutting out portions of the media or providing other destructive edits, and the like.

The application running at the XR device receives one or more edits to the content at block 404. The edits may be received by the XR device responsive to user interactions with a user interface of the XR device. For example, a user may provide edits using gestures, one or more controllers or other devices connected to the XR device (e.g., handheld controllers, keyboards, and the like), voice commands (e.g., using a microphone), and/or other methods of providing input to the XR device. Edits may include, in various examples, annotations to the media (e.g., instructions to make particular changes to the media using other means of editing, notes to others viewing the media, and the like), destructive edits (e.g., cutting out or removing portions of the media), edits to various attributes of the media, and the like. For some content, such as three dimensional media, edits may include, for example, comments on set design, asset transformation, animation changes, and the like. In various examples, edits may be associated with various time codes in the media. The edits may be collectively associated with the rich media asset and saved to create an edited version of the rich media asset. In some examples, the edited version of the rich media asset may replace the original version of the rich media asset at the temporary storage location at the XR device.

At block 406, the XR device releases an edited version of the rich media asset to the server. For example, the AR/VR headset 102 may release an edited version of rich media content to the server 106. The edited version of the rich media asset may, in some examples, be released to the server 106 automatically upon completion of the lifecycle of the application 116. That is, when a user exits, closes, or otherwise terminates the application 116, the edited version of the rich media asset is automatically released to the server 106. The application 116 may further provide functionality allowing the user to voluntarily release the edited version of the rich media asset to the server 106. For example, the user may save intermediate versions of the rich media asset to the server 106 and/or save a completed edited version of the rich media asset to the server 106 while the application 116 is still running.

The edited version of the rich media asset may be stored on the server 106 in the file system 110. In some examples, the edited version of the rich media asset may replace the originally downloaded version of the rich media asset stored on the server 106. That is, the edited version of the rich media asset may overwrite an existing version of the rich media asset at the server 106. In other examples, the edited version of the rich media asset may be stored at a specified location on the server 106 without overwriting or replacing existing versions of the rich media asset. The user may, in some examples, choose a location within the file system 110 to store the edited version of the rich media asset.

In various examples, after releasing the edited version of the rich media asset, the XR device may utilize garbage collection or other methods to remove the edited version of the rich media asset and/or the original version of the rich media asset from the XR device. In some examples, such removal may occur automatically when the application 116 is terminated, such as when a user exits or otherwise terminates the application 116. Accordingly, the rich media asset (and any edited versions of the rich media asset) may not be accessed outside of the application 116, increasing security of the rich media asset on the XR device. Further, as users do not manually clear rich media assets from the XR device, storage space is immediately opened up on the XR device, allowing users to view multiple rich media assets without having to manually download or delete particular assets from the XR device.

Using the systems and methods described above, an XR device, such as an AR/VR headset may be efficiently and securely used to view and edit rich media assets, such as immersive format motion pictures. For example, rich media assets may be accessed by an AR/VR headset directly from a server, without using a wired connection to sideload assets to the headset. An application on the AR/VR headset may allow a user to browse a file system on the server to select a media asset to view using the AR/VR headset, and content associated with the rich media asset may be rendered at the AR/VR headset. The application may also be utilized to provide edits to the content and/or the rich media assets, and edited versions of the rich media assets may be automatically released back to the server upon termination of the application, improving security of rich media assets while efficiently clearing memory space at the AR/VR headset.

The description of certain embodiments included herein is merely exemplary in nature and is in no way intended to limit the scope of the disclosure or its applications or uses. In the included detailed description of embodiments of the present systems and methods, reference is made to the accompanying drawings which form a part hereof, and which are shown by way of illustration specific to embodiments in which the described systems and methods may be practiced. These embodiments are described in sufficient detail to enable those skilled in the art to practice presently disclosed systems and methods, and it is to be understood that other embodiments may be utilized, and that structural and logical changes may be made without departing from the spirit and scope of the disclosure. Moreover, for the purpose of clarity, detailed descriptions of certain features will not be discussed when they would be apparent to those with skill in the art so as not to obscure the description of embodiments of the disclosure. The included detailed description is therefore not to be taken in a limiting sense, and the scope of the disclosure is defined only by the appended claims.

From the foregoing it will be appreciated that, although specific embodiments of the invention have been described herein for purposes of illustration, various modifications may be made without deviating from the spirit and scope of the invention.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

As used herein and unless otherwise indicated, the terms "a" and "an" are taken to mean "one", "at least one" or "one or more". Unless otherwise required by context, singular terms used herein shall include pluralities and plural terms shall include the singular.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

Of course, it is to be appreciated that any one of the examples, embodiments or processes described herein may be combined with one or more other examples, embodiments and/or processes or be separated and/or performed amongst separate devices or device portions in accordance with the present systems, devices and methods.

Finally, the above discussion is intended to be merely illustrative of the present system and should not be construed as limiting the appended claims to any particular embodiment or group of embodiments. Thus, while the present system has been described in particular detail with reference to exemplary embodiments, it should also be appreciated that numerous modifications and alternative embodiments may be devised by those having ordinary skill in the art without departing from the broader and intended spirit and scope of the present system as set forth in the claims that follow. Accordingly, the specification and drawings are to be regarded in an illustrative manner and are not intended to limit the scope of the appended claims.

What is claimed is:

1. A method comprising:
connecting, using an application executing at an extended reality (XR) device, to a file system of rich media assets, the file system being hosted at a server in communication with the XR device;
browsing, via the application at the XR device, the file system of rich media assets to select a rich media asset of the rich media assets;
responsive to selection of the rich media asset, loading the rich media asset from the server to a memory of the XR device;
rendering, at a runtime of the application, content from the rich media asset, wherein the rendering allows the content to be viewed using the XR device;
modifying the rich media asset based on a user input received at a user interface of the application via the XR device to create a modified rich media asset, wherein modifying the rich media asset comprises removing a portion of the content of the rich media asset;
storing the modified rich media asset at the memory of the XR device; and
removing the modified rich media asset from the memory of the XR device at an end of a lifecycle of the application.

2. The method of claim 1, wherein;
the content rendered from the rich media asset is a motion picture; and
modifying the rich media asset further comprises associating a modification with a corresponding time code of the motion picture.

3. The method of claim 1, wherein rendering the content from the rich media asset comprises utilizing one or more processors of the XR device to render the content.

4. The method of claim 1, wherein the server is in communication with the XR device via a shared private network.

5. The method of claim 1, wherein loading the rich media asset from the server comprises temporarily downloading the rich media asset to the memory of the XR device.

6. The method of claim 1, further comprising releasing the modified rich media asset to the server responsive to the end of the lifecycle of the application at the XR device.

7. An extended reality (XR) device comprising:

a user interface;

one or more processors; and memory encoding instructions which, when executed by the one or more processors, cause the one or more processors to:

connect to a file system of rich media assets, the file system of rich media assets being hosted at a server in communication with the XR device, receive a selection of a rich media asset of the rich media assets via a user input to the user interface of the XR device, responsive to the selection of the rich media asset, load the rich media asset to the memory of the XR device, render, at the XR device, content from the rich media asset, wherein the rendering allows the content to be viewed using the user interface of XR device;

modify the rich media asset based on a user input received at the user interface of the XR device to create a modified rich media asset, wherein modifying the rich media asset comprises removing a portion of the content of the rich media asset;

store the modified rich media asset at the memory of the XR device; and remove the modified rich media asset from the memory of the XR device at an end of a lifecycle of an application.

8. The XR device of claim 7, wherein;

the rich media asset is a motion picture; and modifying the rich media asset further comprises associating a modification with a corresponding time code of the motion picture.

9. The XR device of claim 7, wherein the one or more processors are configured to render the media from the rich media asset at the XR device using a rendering engine at the XR device.

10. The XR device of claim 7, wherein the one or more processors are further configured to load the rich media asset from the server by temporarily downloading the rich media asset to the memory of the XR device.

11. The XR device of claim 7, wherein the one or more processors are further configured to release the modified rich media asset to the server responsive to the end of the lifecycle of the application.

12. One or more non-transitory computer readable media encoding instructions which, when executed by one or more processors of an extended reality (XR) device, cause the XR device to:

connect, using a wireless protocol, to a server storing a plurality of rich media assets in a file system;

download, using the wireless protocol, a rich media asset of the plurality of rich media assets, wherein the rich media asset is selected from the file system by a user of the XR device via an application executing at the XR device;

render, at a runtime of the application, content from the rich media asset, wherein the rendering allows the media to be viewed using the XR device;

modify the rich media asset based on a user input received at a user interface of the application via the XR device to create a modified rich media assert, wherein modifying the rich media asset comprises removing a portion of the content of the rich media asset;

store the modified rich media asset at a memory of the XR device; and remove the modified rich media asset from the memory of the XR device at an end of a lifecycle of the application.

13. The one or more non-transitory computer readable media of claim 12, wherein:

the rich media asset is a motion picture; and modifying the rich media asset further comprises associating a modification with a corresponding time code of the motion picture.

14. The one or more non-transitory computer readable media of claim 12, wherein rendering, at the runtime of the application, the content from the rich media asset comprises utilizing a rendering engine executing on the one or more processors of the XR device.

15. The one or more non-transitory computer readable media of claim 12, wherein the wireless protocol comprises a shared and secured Wi-Fi network.

16. The one or more non-transitory computer readable media of claim 12, wherein downloading the rich media asset comprises downloading the rich media asset to a temporary storage location of the XR device.

17. The one or more non-transitory computer readable media of claim 12, wherein the instructions further cause the XR device to:

release the modified rich media asset to the server responsive to the end of the lifecycle of the application.

18. The method of claim 1, wherein modifying the rich media asset further comprises modifying an attribute of the content of the rich media asset.

19. The method of claim 1, wherein:

the XR device comprises an augmented reality and virtual reality headset (AR/VR headset); and the user input comprises at least one of a gesture, voice command, or controller input received via the AR/VR headset.

* * * * *